US009690262B2

(12) United States Patent
Chen et al.

(10) Patent No.: US 9,690,262 B2
(45) Date of Patent: Jun. 27, 2017

(54) DISPLAY DEVICE AND METHOD FOR REGULATING VIEWING ANGLE OF DISPLAY DEVICE (71) Applicant: BOE TECHNOLOGY GROUP CO., LTD., Beijing (CN)

(72) Inventors: Shuo Chen, Beijing (CN); Tianyue Zhao, Beijing (CN); Kailiang Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 24 days.

(21) Appl. No.: 14/768,951

(22) PCT Filed: Oct. 21, 2014

(86) PCT No.: PCT/CN2014/089055
§ 371 (c)(1),
(2) Date: Aug. 19, 2015

(87) PCT Pub. No.: WO2016/026204
PCT Pub. Date: Feb. 25, 2016

(65) Prior Publication Data
US 2016/0259305 A1 Sep. 8, 2016

(30) Foreign Application Priority Data
Aug. 22, 2014 (CN) .......................... 2014 1 0418405

(51) Int. Cl.
G05B 11/44 (2006.01)
G10L 25/51 (2013.01)
(Continued)

(52) U.S. Cl.
CPC .............. G05B 11/44 (2013.01); G10L 25/51 (2013.01); G10L 25/72 (2013.01); H04R 3/005 (2013.01);
(Continued)

(58) Field of Classification Search
CPC ......... G10L 15/00; G10L 25/51; G10L 25/72; G09G 5/003; H04S 7/00; H04S 1/00; G06T 7/00; G06F 3/16; G06F 3/048
(Continued)

(56) References Cited

U.S. PATENT DOCUMENTS 7,626,569 B2 * 12/2009 Lanier .................. G06F 1/1601
345/156
2006/0028556 A1 * 2/2006 Bunn ...................... G10L 15/25
348/211.99
(Continued)

FOREIGN PATENT DOCUMENTS

CN 101465091 A 6/2009
CN 102063887 A 5/2011
(Continued)

OTHER PUBLICATIONS

Chinese Office Action in Chinese Application No. 201410418405.7 mailed Mar. 16, 2016 with English translation.
(Continued)

Primary Examiner — Mohammad Islam
(74) Attorney, Agent, or Firm — Collard & Roe, P.C.

(57) ABSTRACT

A display device and a method for regulating a viewing angle of a display device are provided and can realize the automatic regulation of angle. The display device comprises: a display main body (1); a base (2); at least three voice receiving devices (3) configured to receive voice information from outside of the display device and arranged on the display main body (1) and/or on the base (2), and projections, on a horizontal plane, of the voice receiving devices (3) being not located in a same straight line; a control device configured for recording a time point when it receives the voice information inputted by each of the voice receiving devices (3), calculating time difference between time points when any two of the voice receiving devices (3)

(Continued)

receive the voice information, determining a location where the voice information is emitted according to the time difference and sending out a rotating instruction; and a rotation device (4) configured for rotating the display main body (1) according to the rotating instruction.

17 Claims, 5 Drawing Sheets

(51) Int. Cl.
*G10L 25/72* (2013.01)
*H04R 3/00* (2006.01)
*G10L 15/00* (2013.01)

(52) U.S. Cl.
CPC ........ *G10L 15/00* (2013.01); *H04R 2201/025* (2013.01); *H04R 2430/21* (2013.01); *H04R 2499/15* (2013.01)

(58) Field of Classification Search
USPC ............................................ 381/92; 345/156
See application file for complete search history.

(56) References Cited

U.S. PATENT DOCUMENTS

| | | |
|---|---|---|
| 2009/0025022 A1 | 1/2009 | Blatchley et al. |
| 2010/0303254 A1* | 12/2010 | Yoshizawa ............ G01S 3/8083 381/92 |
| 2011/0138286 A1* | 6/2011 | Kaptelinin .............. G06F 3/038 715/728 |
| 2014/0191945 A1* | 7/2014 | Wang .................... G06F 1/1601 345/156 |
| 2015/0027285 A1* | 1/2015 | Okuyama ................ B26D 5/00 83/72 |
| 2015/0220299 A1* | 8/2015 | Kim ...................... G06F 1/1605 345/1.3 |
| 2015/0382130 A1* | 12/2015 | Connor ................... H04S 7/304 381/303 |
| 2016/0299574 A1* | 10/2016 | Chen ..................... G06F 1/1601 |

FOREIGN PATENT DOCUMENTS

| | | |
|---|---|---|
| CN | 102117074 A | 7/2011 |
| CN | 102305925 A | 1/2012 |
| CN | 102624978 A | 8/2012 |
| CN | 102820022 A | 12/2012 |
| CN | 103841357 A | 6/2014 |
| CN | 103914131 A | 7/2014 |
| JP | H 6-141309 A | 5/1994 |
| JP | 2011-047740 A | 3/2011 |

OTHER PUBLICATIONS

Second Chinese Office Action in Chinese Application No. 201410418405.7 mailed Jul. 7, 2016 with English translation.
International Search Report of PCT/CN2014/089055 in Chinese, mailed May 27, 2015 with English translation.
Notice of Transmittal of the International Search Report of PCT/CN2014/089055 in Chinese, mailed May 27, 2015.
Written Opinion of the International Searching Authority of PCT/CN2014/089055 in Chinese, mailed May 27, 2015 with English translation.
Chinese Office Action in CN 201410418405.7 dated Dec. 20, 2016.

* cited by examiner

DISPLAY DEVICE AND METHOD FOR REGULATING VIEWING ANGLE OF DISPLAY DEVICE

CROSS REFERENCE TO RELATED APPLICATIONS

This application is the National Stage of PCT/CN2014/089055 filed on Oct. 21, 2014, which claims priority under 35 U.S.C. §119 of Chinese Application No. 201410418405.7 filed on Aug. 22, 2014, the disclosure of which is incorporated by reference.

TECHNICAL FIELD

At least one embodiment of the present disclosure relates to a display device and a method for regulating a viewing angle of a display device.

BACKGROUND

With the improvement of science and technology levels, living quality has been the pursuance of people, and display devices are becoming common electronic products. At present, it is possible to regulate the viewing angle of a display device as required by viewers, so that the viewers can obtain an easeful viewing effect.

SUMMARY

At least one embodiment of the present disclosure provides a display device and a method for regulating a viewing angle of a display device, so as to achieve automatic rotation of the display device.

At least one embodiment of the present disclosure provides a display device, which comprises: a display main body; a base for supporting the display main body; at least three voice receiving devices, configured to receive voice information from outside of the display device and arranged on the display main body and/or on the base, projections, on a horizontal plane, of the voice receiving devices being not located in a same straight line; a control device, configured for recording a time point when the control device receives the voice information inputted by each of the voice receiving devices, calculating time difference between time points when any two of the voice receiving devices receive the voice information, determining a location where the voice information is emitted according to the time difference and sending out a rotating instruction; and a rotation device configured for rotating the display main body according to the rotating instruction.

At least one embodiment of the present disclosure also provides a method for regulating a viewing angle of a display device, and the method comprises: receiving voice information emitted from outside of the display device through at least three voice receiving devices; recording a time point when the voice information, each of the voice receiving devices inputs, is received, calculating time difference between time points when any two of the voice receiving devices receive the voice information, to determine a location where the voice information is emitted and to send out a rotating instruction; and rotating the display main body according to the rotating instruction.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE NUMERALS

1: display main body; 2: base; 3: voice receiving device; 4: rotation device; 5: camera.

DETAILED DESCRIPTION

In order that those skilled in the art understand the technical solution of the present disclosure better, a further detailed description for the present disclosure will be made in conjunction with the drawings and specific embodiments.

The inventors of the present application noted that the realization of a method for regulating an angle usually comprises: regulating the angle of a display device through manual regulation or repeated control/regulation by means of remote controller, or the like, so as to obtain an easeful viewing angle. In such a method, however, it is required for a viewer to operation repeatedly before obtaining an easeful viewing angle. With the growth of the techniques, another method for regulating a viewing angle of a display device is also achieved by adopting a method in which an image pick-up apparatus is assembled onto the display device to capture pictures of a viewer to determine the location of the viewer. However, when there are a plurality of head portraits of viewers within the range of the pictures captured by the image pick-up apparatus, it is difficult to determine which is the viewer and which belongs to an interference head portrait, therefore, such a method cannot determine accurately the location of the viewer, and cannot ensure a real viewer to obtain a preferred viewing angle upon regulating the angle of a display device.

Embodiment 1

As illustrated in FIGS. 1 to 5, the present embodiment provides a display device comprising a display main body 1, a base 2, a control device, a rotation device 4 and at least three voice receiving devices 3; the base 2 is configured for supporting the display main body 1; the at least three voice receiving devices 3 are configured to receive voice information from the outside of the display device, the voice receiving devices are arranged on the display main body 1 and/or on the base 2, and projections, on a horizontal plane, of the voice receiving devices are not located in a same straight line; the control device is configured for recording a time point when the control device receives the voice information inputted by each of the voice receiving devices 3, calculating time difference between time points when any two of the voice receiving devices 3 receive the voice information, determining a location where the voice information is emitted according to the time difference, and sending out a rotating instruction to the rotation device 4; and the rotation device 4 is configured to rotate the display main body 1 according to the rotating instruction sent out by the control device and sent out after the determination of the location where the voice information is emitted.

At least three voice receiving devices 3 are provided on the display main body 1 and/or the base 2 of the display device of this embodiment, and therefore according to the principle of the TDOA (Time Difference Of Arrival) direction-finding/positioning method (i.e., a positioning method based on time difference), the relative distances among the voice receiving devices 3 are known, and the distances by which the voice information (sound) travels to the voice receiving devices 3 are distinct from each other, time difference occurs among the time points when the voice receiving devices 3 receive the voice information respectively, thus, by recording such time difference, it is possible to work out the relative location between the voice information and each of the voice receiving devices 3, determine the location where the voice information is emitted, and in turn calculate the angle θ between the connecting line, from the location where the voice information is emitted to the center point of the display surface of the display main body 1, and the line that passes the center point and extends in the horizontal direction (i.e., the x-axis) on the display surface of the display main body. As a result, the rotation device 4 can rotate the display main body 1 based on the angle θ. The display device provided by this embodiment can intelligently determine the location where the voice information is emitted, and rotate the display main body 1 through the rotation device 4, so that the one presenting the voice information can watch the picture shown by the display device, and thus automatic rotation of the display device is achieved.

In one example, the display device of this embodiment can further comprise a voice recognition device, in which voice information is prestored, the voice recognition device is used for analyzing whether the voice information received by any one of the voice receiving devices 3 matches the voice information prestored therein, and transmitting an analysis result to the control device, then the control device controls whether the rotation device 4 is to operate or not based on the analysis result. If the rotation device 4 is to operate, the control device determines the location where the voice information is emitted according to the time difference, and sends out a rotating instruction so as to control the rotation device 4 to rotate the display main body; or otherwise, the voice recognition device continues and returns to check whether the voice information received by the voice receiving device is the voice information set therein. The voice recognition device is usually prestored with relevant voice information, for example, for a household display device, the voice recognition device can be stored with voice information of the family members (for example, tone, audio frequency and similar information that can represent every member), thereby, it is possible to prevent the voice recognition device from disturbance of other surrounding sound and then allow for even more accurate determination about the location where the voice information is emitted. Of cause, when the display device is applied in different sites, voice information within the voice recognition device can also be preset, so that the display device can perform automatic rotation even more accurately.

In at least one example, the control device comprises: a storage unit for storing an optimal viewing angle range when a viewer watches the display main body 1 at the location where the voice is emitted, and the viewing angle range is $[\omega+k, 180°-\omega-k]$, in which to is set with different numeric values based on different modes of the display device, and $0°\leq k\leq 90°-\omega$. It is to be noted that when $k=0°$, the optimal viewing angle range is $[\omega, 180°-\omega]$, and because to is the minimal limit for the viewing angle of a display device caused by the hardware of the display device per se, the region $[\omega, 180°-\omega]$ is also the maximal viewing angle range for the display device. For example, a display device of FFS mode has an ω value of 10°, and when $k=0°$, its maximal (optimal) viewing angle is in a range of $[10°, 170°]$; and a display device of VA mode has an ω value of 20°, and when $k=0°$, its maximal (optimal) viewing angle is in a range of $[20°, 160°]$. Of course, k can be set to be 10°, 20°, 30° or the like to even more greatly meet the viewing requirement of users, here a display device of FFS mode is also taken as an example, and when k is set to be 10°, 20° or 30° respectively, corresponding optimal viewing angle range for this display device are $[20°, 160°]$, $[30°, 150°]$ or $[40°, 140°]$, respectively, and further, the value of k can be variable according to different requirements of the users.

In one example, when the viewing angle range is $[\omega+k, 180°-\omega-k]$, that the control device sends a rotating instruction after determining the location where the voice information is emitted so as to control the rotation device 4 rotate the display main body 1, for example, comprises: based on the location, determined by the control device, where the voice information is emitted, the control device calculates the angle θ between the connecting line, from the center point on a display surface of the display main body 1 to the location where the voice information is emitted, and the line that passes the center point and extends in a horizontal direction on the display surface, then determines whether this angle θ is within the optimal viewing angle range; and if the angle θ is out of the optimal viewing angle range, the control device controls the rotation device 4 to rotate the display main body, until the display main body is rotated into the optimal viewing angle range.

In one example, that if the angle θ is not within the optimal viewing angle range, the control device controls the rotation device 4 to rotate the display main body, until the display main body 1 is rotated into the optimal viewing angle range, for example, comprises: the control device is configured to work out, based on the angle θ, a rotation angle σ, by which the rotation device 4 is to rotate the display main body, and control the rotation device 4 to rotate the display main body 1;

when $\theta \in [0°, \omega+k), \sigma = \theta - \omega - k;$ when $\theta \in (270°, 360°], \sigma = \theta - \omega - k - 360°;$ and when $\theta \in (180°-\omega-k, 270°], \sigma = \theta - (180°-\omega-k);$ in which the plus-minus of the value for the rotation angle σ corresponds respectively to the clockwise rotation direction and anticlockwise rotation direction of the display main body when viewing the display main body from the top: when σ is positive, the display main body is rotated clockwise, and when σ is negative, the display main body is rotated anticlockwise.

Taking a display device of FFS model as an example, $\omega=10°$, $k=10°$, when the calculated angle $\theta=5°$, the rotation angle σ=θ−ω−k=5°−10°−10°=−15°, in this case, the rotation device 4 rotates the display main body 1 anticlockwise by a rotation angle σ of 15°; when θ=280°, the rotation angle σ=θ−ω−360°−k°=280°−10°−360°−10°=−100°, in this case, the rotation device 4 rotates the display main body 1 anticlockwise by a rotation angle σ of 100°; and when θ=260°, the rotation angle σ=θ−(180°−ω−k)=260°−(180°−10°−10°)=100°, and in this case, the rotation device 4 rotates the display main body 1 clockwise by a rotation angle σ of 100°.

Figure 1:
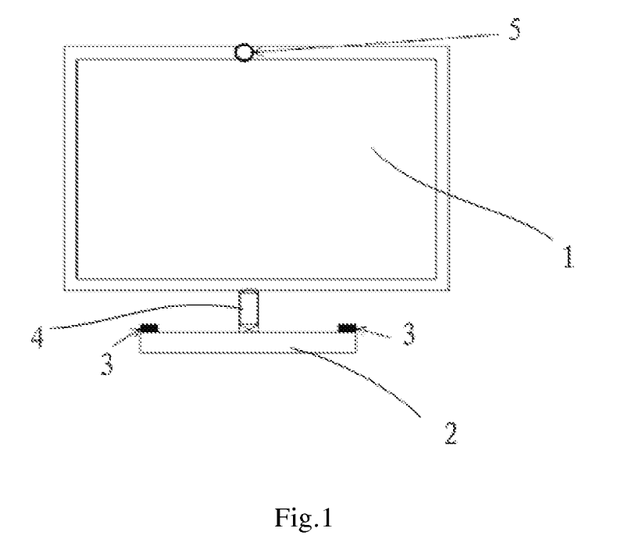
FIG. 1 is a front view of a display device in embodiment 1 of the present disclosure.
Figure 2:
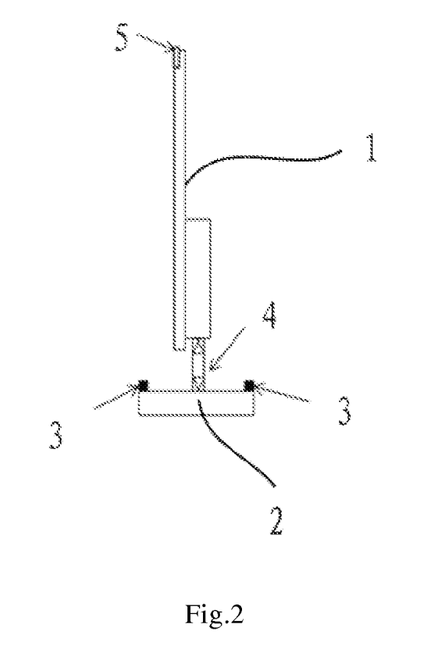
FIG. 2 is a side view of a display device in embodiment 1 of the present disclosure.
Figure 3:
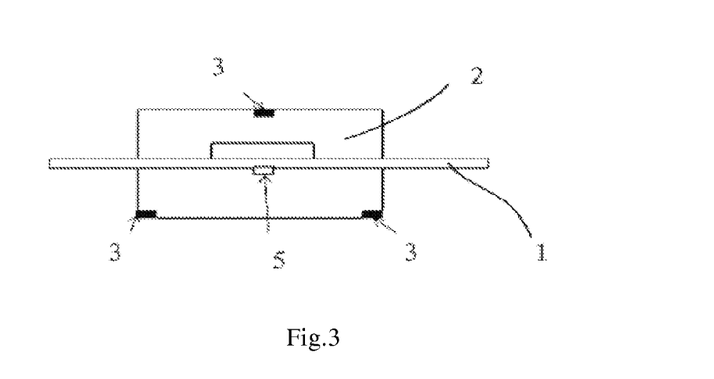
FIG. 3 is a top view of a display device in embodiment 1 of the present disclosure.
Figure 4:
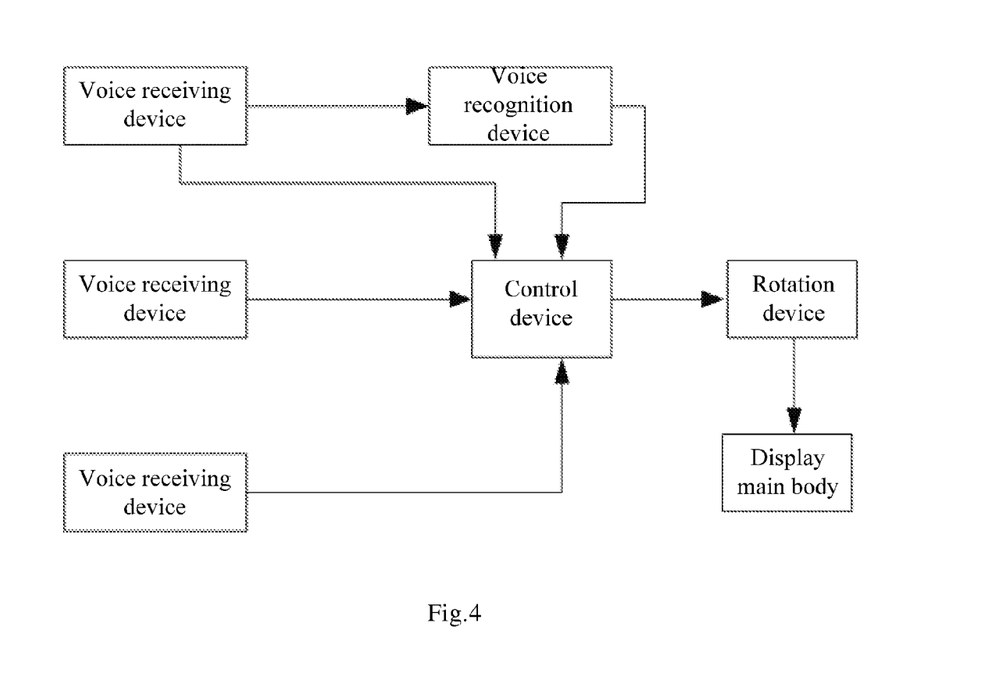
FIG. 4 is a schematic diagram of a display device in embodiment 1 of the present disclosure.
Figure 5:
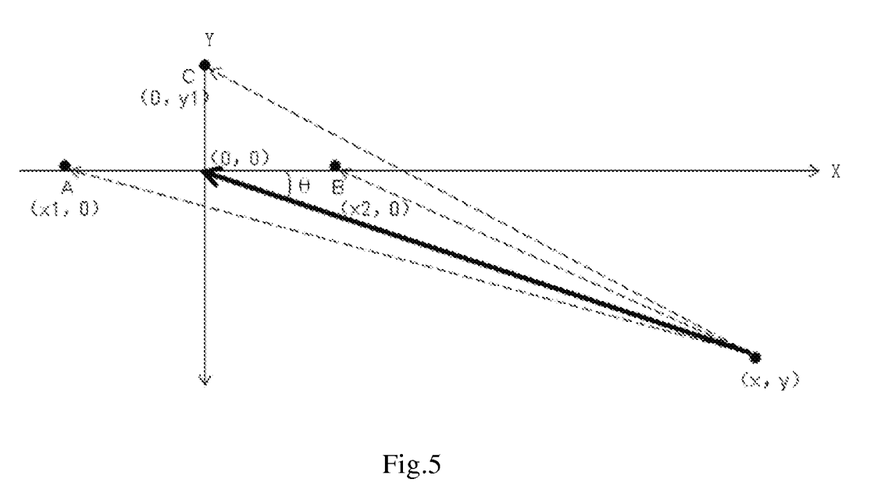
FIG. 5 is a schematic diagram illustrating calculation of a viewing angle of a display device in embodiment 1 of the present disclosure.

In order for esthetic appearance and the principle of saving costs, in at least one example, the voice receiving devices 3 can be provided on the base 2, and the voice receiving devices are located in an identical plane. In at least one example, the number of the voice receiving devices 3 can be three. In at least one example, the each of the voice receiving devices 3 can be a microphone. For example, as illustrated in FIG. 5, the locations, where three voice receiving devices (for example, microphones) 3 are provided, are used to establish a coordinate system, the coordinates for the three points are (x1, 0), (x2, 0) and (0, y1), respectively; if the location where the voice information is emitted has a coordinate (x, y), because the distances that the voice information transmits from the location where the voice information is emitted to the three microphones, respectively, are different, thus there is time difference among the time points that the three microphones respectively receive the voice information, but the sound has a constant propagation speed, by analyzing the time difference and the speed of sound through the control device, the relative location between the location where the voice information is emitted and each of the three microphones can be worked out, and thus the location where the voice information is emitted is determined, that is to say, the angle θ between a line that passes a center point of a display surface of the display device and extends in a horizontal direction, and a connecting line from the location where the voice information is emitted to the center point can be worked out.

In at least one example, the rotation device 4 can be a step motor. In at least one example, the rotation device 4 drives the display main body 1 by a rotation angle in a range from 0° to 360°. Due to the fact that the rotation device 4 can control the display device to perform a 360° rotation, no matter where the voice information is emitted, it is possible to watch the picture shown by the display device better.

Of course, in order to achieve a video function, in at least one example, the display device can further comprise a camera 5 provided at a frame of the display main body 1.

The display device of this embodiment can achieve a function of automatic rotation, and thus such a display device is even more intelligent.

Embodiment 2

Figure 6:
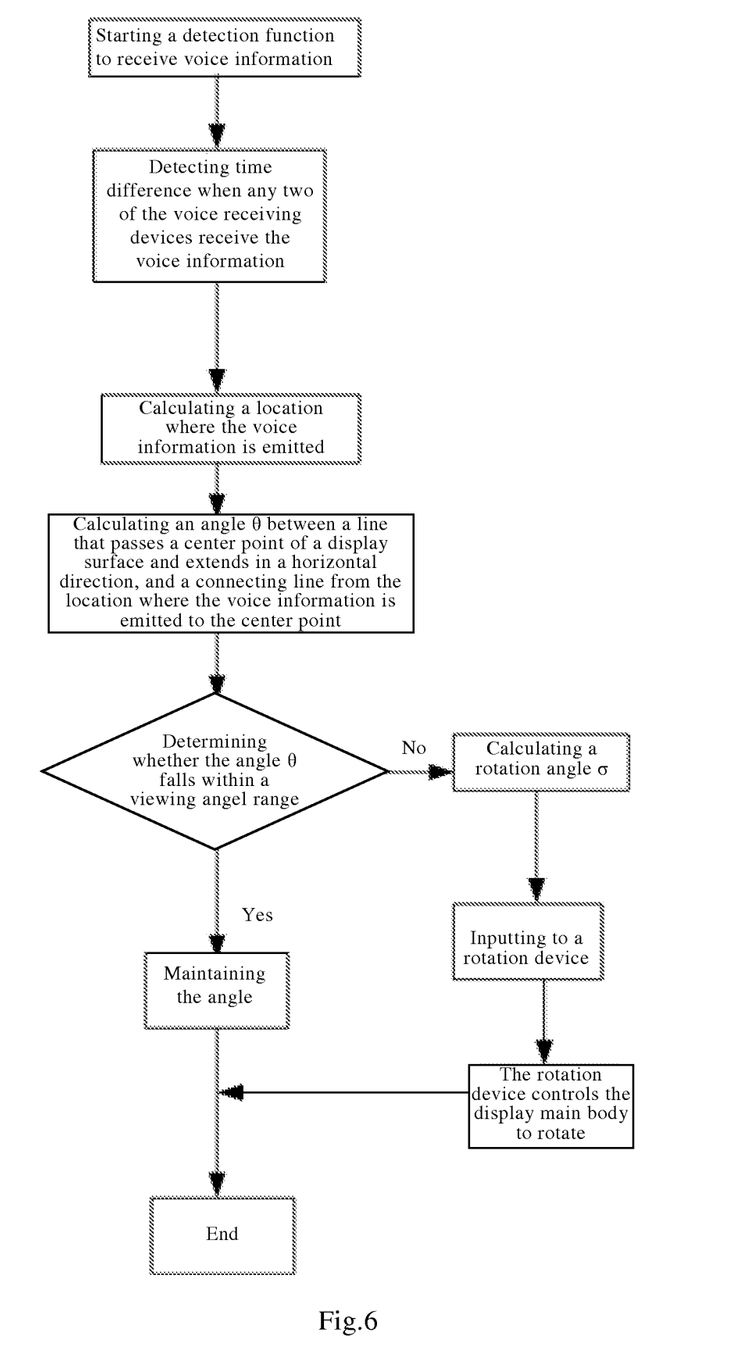
FIG. 6 is a flow chart showing a method for regulating to viewing angle of a display device in embodiment 2 of the present disclosure.

With respect to FIG. 6, this embodiment provides a method for regulating a viewing angle of a display device, and this method for regulating the viewing angle of the display device comprises: receiving voice information emitted from the outside of the display device through at least three voice receiving devices; recording a time point when the voice information inputted by each of the voice receiving devices is received, calculating time difference between time points when any two of the voice receiving devices receive the voice information, so as to determine the location where the voice information is emitted and send out a rotating instruction; and rotating the display main body based on the rotating instruction. The display device can be the one in embodiment 1, which comprises a display main body 1, a base 2 for supporting the display main body 1, at least three voice receiving devices, a control device and a rotation device. In this case, the method for regulating the viewing angle of the display device can comprise steps 1 to 5 described as follows, and a detailed introduction about these steps will be afforded.

Step one, a detection function of the display device is started, voice information emitted from the outside of the display device is received through at least three voice receiving devices 3 provided on the display main body 1 and/or the base 2, and the received voice information is outputted to the control device.

Step two, the control device records a time point when the control device receives the voice information inputted by each of the voice receiving devices 3, and calculates time difference between time points when any two of the voice receiving devices 3 receive the voice information.

Step three, the control device determines the location relationship between the location, where the voice information is emitted, and a display surface of the display main body 1, based on the time difference.

For example, the step three can comprise: the control device determines the location where the voice information is emitted, based on the time difference, then works out the angle θ between the line that passes the center point of the display surface of the display main body 1 and extends in a horizontal direction on the display surface, and the connecting line from the center point to the location where the voice information is emitted, and determines whether the angle θ is within the optimal viewing angle range [ω+k,180°−ω−k], which is set in a storage unit of the display device, and in which ω is set to be different numeric values based on the display device of different modes, and 0°≤k≤90°−ω. It is to be noted that when k=0°, the optimal viewing angle range is [ω, 180°−ω], and because ω is a minimal limit for the viewing angle of a display device caused by the hardware of the display device per se, here the region [ω, 180°−ω] also means a maximal viewing angle range for the display device. For example, the display device of FFS mode has an ω value of 10°, and when k=0°, its maximal (optimal) viewing angle is in a range of [10°, 170°]; and a display device of VA mode has an ω value of 20°, and when k=0°, its maximal (optimal) viewing angle is in a range of [20°, 160°]. Of course, k can be set to be 10°, 20°, 30° or the like so as to even more greatly meet the viewing requirement of users. Here a display device of FFS mode is also taken as an example, when k is set to be 10°, 20° or 30° respectively, the corresponding optimal viewing angle range for this display device is [20°, 160°], [30°, 150°] or [40°, 140°], respectively, and further, the value for k can be variable according to different requirements of the users. If the angle θ is within the optimal viewing angle range [ω+k, 180°−ω−k] set in the storage unit of the display device, the display main body 1 maintains this angle, or otherwise, such an angle information is sent to the rotation device 4, and then the display main body 1 is rotated, that is, a step four is performed.

Step four, if the angle θ is out of the optimal viewing angle range, the control device controls the rotation device 4 to rotate the display main body 1, until the display main body 1 is rotated into the optimal viewing angle range. This step comprises, for example: the control device is configured for working out the rotation angle σ, by which the rotation device 4 is to rotate the display main body 1, based on the angle θ;

when θ∈[0°,ω+k),σ=θ−ω−k;

when θ∈(270°,360°],σ=θ−ω−$k$−360°; and when θ∈(180°−ω−$k$,270°],σ=θ−(180°−ω−$k$);

in which the plus-minus of the value of the rotation angle σ corresponds respectively to a clockwise rotation direction and an anticlockwise rotation direction of the display main body when the display main body is viewed from the top: when σ is positive, the display main body is rotated clockwise, and when is negative, the display main body is rotated anticlockwise.

Taking a display device of FFS model as an example, ω=10°, k=10°, when the calculated angle θ=5°, the rotation angle σ=θ−ω−k=5°−10°−10°=−15°, and in this case, the rotation device 4 rotates the display main body 1 anticlockwise by a rotation angle σ of 15°; when θ=280°, the rotation angle σ=θ−ω−360°−k°=280°−10°−360°−10°=−100°, and in this case, the rotation device 4 rotates the display main body 1 anticlockwise by a rotation angle σ of 100°; and when θ=260°, the rotation angle σ=θ−(180°−ω−k)=260°−(180°−10°−10°)=100°, and in this case, the rotation device 4 rotates the display main body 1 clockwise by a rotation angle σ of 100°.

Step five, the rotation device 4 rotates the display main body 1 up to the optimal viewing angle, based on the rotation angle σ calculated by the control device.

Embodiment 3

Figure 7:
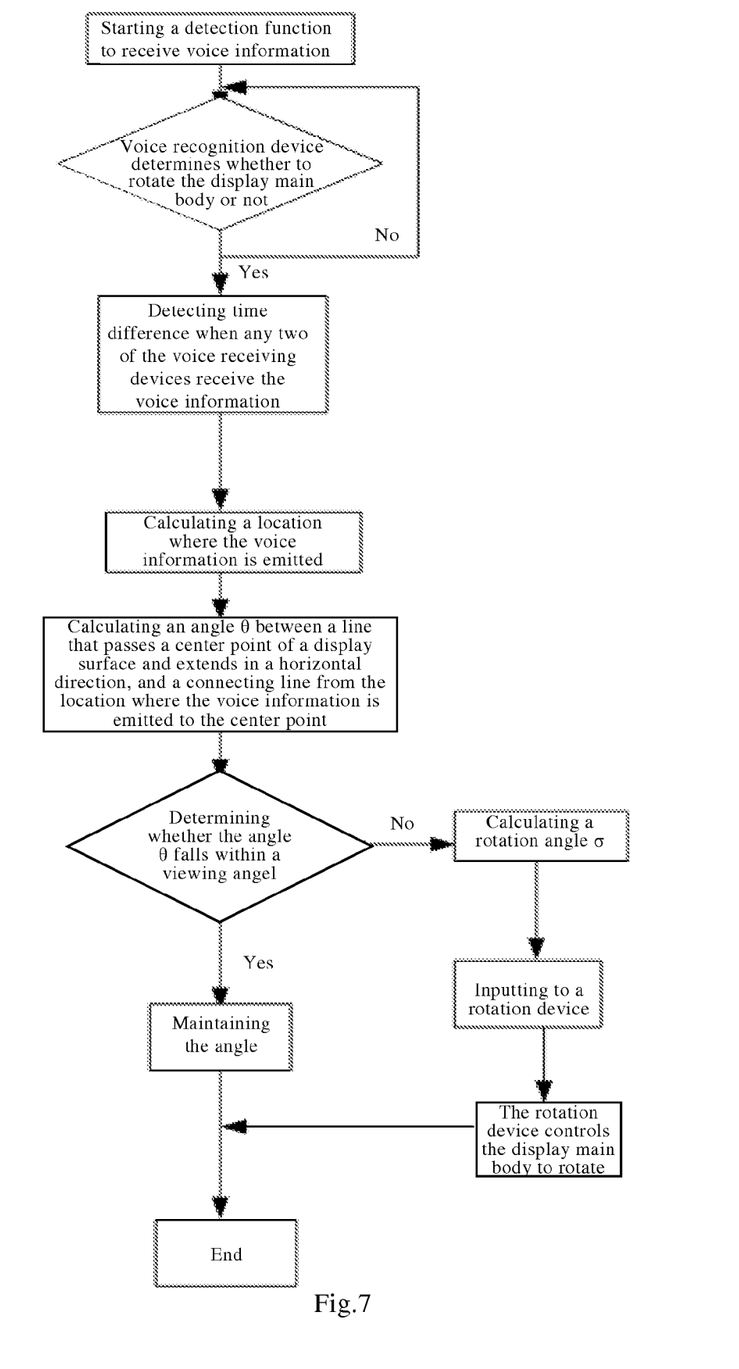
FIG. 7 is a flow chart showing a method for regulating a viewing angle of a display device in embodiment 3 of the present disclosure.

With respect to FIG. 7, this embodiment provides a method for regulating a viewing angle of a display device, and in this method for regulating the viewing angle of the display device, before determining the location where the voice information is emitted and sending out a rotating instruction, the method can further comprise: analyzing the received voice information, and controlling the display main body to rotate or not based on an analysis result; and if the display main body being to rotate, then determining the location where the voice information is emitted, sending out the rotating instruction, and rotating the display main body based on the rotating instruction. The display device can be the one of embodiment 1 and comprises the display main body 1, the base 2 for supporting the display main body 1, at least three voice receiving devices, the control device and the rotation device. In this case, a case, in which a voice recognition device is utilized to analyze whether the voice information received by a voice receiving device matches voice information stored in the voice recognition device, is taken as an example, and the method for regulating the viewing angle of the display device can comprise steps one to five as follows, and a detail introduction will be made to these steps in the following.

Step one, a detection function of the display device is started, the voice information emitted from outside of the display device is received through at least three voice receiving devices 3 provided on the display main body 1 and/or the base 2, and the received voice information is outputted to the control device.

Step two, each of the voice receiving devices 3 transmits the received voice information to the voice recognition device, the voice recognition device analyzes whether the voice information received by the voice receiving device 3 matches the voice information stored therein and transmits an analysis result to the control device, the control device controls the rotation device 4 to operate or not, based on the analysis result, if yes, step three is performed, and if no, the process returns to step one.

Step three, the control device records a time point when it receives the voice information inputted by each of the voice receiving devices 3, and calculates time difference between time points when any two of the voice receiving devices 3 receive the voice information.

Step four, the control device determines the location relationship between the location, where the voice information is emitted, and the display surface of the display main body 1, based on the time difference.

For example, the step four can comprise: the control device determines the location where the voice information is emitted, based on the time difference, then works out the angle θ between the line that passes the center point of the display surface of the display main body 1 and extends in a horizontal direction on the display surface, and the connecting line from the center point to the location where the voice information is emitted, and determines whether the angle θ is within the optimal viewing angle range [ω+k, 180°−ω−k], which is set in the storage unit of the display device and in which to is set to be different numeric values based on the display device of different modes, and 0°≤k≤90°—ω. It is to be noted that, when k=0°, the optimal viewing angle range is [ω, 180°−ω], and because to is the minimal limit for the viewing angle of a display device caused by the hardware of the display device per se, here the region [ω, 180°−ω] also means the maximal viewing angle range for the display device. For example, a display device of FFS mode has an ω value of 10°, when k=0°, its maximal (optimal) viewing angle range is [10°, 170°], and a display device of VA mode has an ω value of 20°, when k=0°, its maximal (optimal) viewing angle range is [20°, 160°]. Of course, k can be set to be 10°, 20°, 30° or the like to even more greatly meet the viewing requirements of users. Here a display device of FFS mode is also taken as an example, when k is set to be 10°, 20° or 30° respectively, corresponding optimal viewing angle range for this display device is [20°, 160°], [30°, 150°] or [40°, 140°] respectively, and further, the value for k can be variable according to different requirements of the users. If the angle θ is within the optimal viewing angle range [ω+k, 180°−ω−k] set in the storage unit of the display device, the display main body 1 maintains this angle, or otherwise, such angle information is sent to the rotation device 4 to rotate the display main body 1, that is, to perform a step five.

Step five, if the angle θ is not within the optimal viewing angle range, the control device controls the rotation device 4 to rotate the display main body 1, until the display main body 1 is rotated into the optimal viewing angle range. For example, this step comprises: the control device is configured to, based on the angle θ, calculate a rotation angle σ, by which the rotation device 4 rotates the display main body 1;

when θ∈[0°,ω+$k$),σ=θ−ω−$k$;

when θ∈(270°,360°],σ=θ−ω−$k$−360°; and when θ∈(180°−ω−$k$,270°],σ=θ−(180°−ω−$k$);

in which the plus-minus of the value for the rotation angle σ corresponds respectively to the clockwise rotation direction and anticlockwise rotation direction of the display main body when the display main body is viewed from the top: when σ is positive, the display main body is rotated clockwise, and when σ is negative, the display main body is rotated anticlockwise.

Taking a display device of FFS model as an example, ω=10°, k=10°, when the calculated angle θ=5°, the rotation angle $\sigma=\theta-\omega-k=5°-10°-10°=-15°$, and in this case, the rotation device 4 rotates the display main body 1 anticlockwise by a rotation angle $\sigma$ of 15°; when $\theta=280°$, the rotation angle $\sigma=\theta-\omega-360°-k°=280°-10°-360°-10°=-100°$, and in this case, the rotation device 4 rotates the display main body 1 anticlockwise by a rotation angle $\sigma$ of 100°; and when $\theta=260°$, the rotation angle $\sigma=\theta-(180°-\omega-k)=260°-(180°-10°-10°)=100°$, and in this case, the rotation device 4 will rotate the display main body 1 clockwise by a rotation angle $\sigma$ of 100°.

It is to be noted that, the voice recognition and determination step, i.e., step two of embodiment three, is a preferable step, and in order for an even more accurate determination, a voice recognition device is assembled onto the display device with voice information prestored therein, and the voice recognition device is configured for analyzing whether the voice information received by any one of the voice receiving device matches the voice information stored therein, and transmitting an analysis result to the control device, the control device controls the rotation device to operate or not, based on the analysis result, and if the rotation device is to operate, a subsequent step is performed.

It's to be understood that the above embodiments are only exemplary embodiments used for explaining the principle of the present disclosure; however, the present disclosure is not limited thereto. Various modifications and improvements can be made by the ordinary skilled in this art without departing from the spirit and essence of the present disclosure, and all of the modifications and improvements are within the protective scope of the present disclosure.

The present application claims the priority of the Chinese Patent Application No. 201410418405.7, filed on Aug. 22, 2014, the entirety of which is incorporated herein by reference as a part of the present application.

What is claimed is:

1. A display device comprising:
   a display main body;
   a base for supporting the display main body;
   at least three voice receiving devices, configured to receive voice information from outside of the display device, wherein the voice receiving devices are arranged on the display main body and/or on the base, and projections, on a horizontal plane, of the voice receiving devices are not located in a same straight line;
   a control device, configured for recording a time point when the control device receives the voice information inputted by each of the voice receiving devices, calculating time difference between time points when any two of the voice receiving devices receive the voice information, determining a location where the voice information is emitted according to the time difference and sending out a rotating instruction; and
   a rotation device, configured for rotating the display main body according to the rotating instruction; wherein:
   the control device is configured to calculate an angle $\theta$ between a connecting line, which is from a center point on a display surface of the display main body to the location where the voice information is emitted, and a line that passes the center point and extends in a horizontal direction on the display surface, and to determine whether the angle $\theta$ falls within an optimal viewing angle range; and
   if the angle $\theta$ is not within the optimal viewing angle range, the control device is configured to control the rotation device to rotate the display main body until the angle $\theta$ is rotated into the optimal viewing angle range.

2. The display device according to claim 1, further comprising: a voice recognition device, provided with voice information prestored therein and configured for analyzing whether the voice information received by any one of the voice receiving devices matches the voice information prestored in the voice recognition device, and for transmitting an analysis result to the control device,
   wherein the control device controls the rotation device to operate or not according to the analysis result, and if the rotation device is to operate, the control device determines the location where the voice information is emitted according to the time difference and sends out the rotating instruction to control the rotation device to rotate the display main body.

3. The display device according to claim 2, wherein each of the voice receiving devices is arranged on the base, and the voice receiving devices are arranged in a same plane.

4. The display device according to claim 1, wherein the control device comprises a storage unit for storing the optimal viewing angle range [$\omega+k$, $180°-\omega-k$], in which the display main body is viewed from the location where the voice information is emitted, wherein $\omega$ has a certain numeric value according to different modes of the display device, and $0°\leq k\leq 90°-\omega$.

5. The display device according to claim 4, wherein each of the voice receiving devices is arranged on the base, and the voice receiving devices are arranged in a same plane.

6. The display device according to claim 1, wherein if the angle $\theta$ is not within the optimal viewing angle range, the control device is configured to, based on the angle $\theta$, calculate a rotation angle $\sigma$, by which the rotation device is to rotate the display main body, so as to control the rotation device to rotate the display main body;

in response to $\theta\in[0°,\omega+k),\sigma=\theta-\omega-k;$ in response to $\theta\in(270°,360°],\sigma=\theta-\omega-k-360°;$ in response to $\theta\in(180°-\omega-k,270°],\sigma=\theta-(180°-\omega-k);$
   and
   wherein where $\sigma$ is positive, the display main body is rotated clockwise, and where $\sigma$ is negative, the display main body is rotated anticlockwise.

7. The display device according to claim 1, wherein each of the voice receiving devices is arranged on the base, and the voice receiving devices are arranged in a same plane.

8. The display device according to claim 1, wherein a number of the voice receiving devices is three.

9. The display device according to claim 1, wherein each of the voice receiving devices comprises a microphone.

10. The display device according to claim 1, wherein the rotation device comprises a step motor.

11. The display device according to claim 1, wherein a rotation angle range, by which the rotation device rotates the display main body, is from 0° to 360°.

12. The display device according to claim 1, further comprising: a camera arranged on a frame of the display main body.

13. A method for regulating a viewing angle of a display device, comprising:
   receiving voice information emitted from outside of a display device through at least three voice receiving devices;
   recording a time point when the voice information input by each of the voice receiving devices inputs is received, calculating time difference between time points when any two of the voice receiving devices receive the voice information, to determine a location where the voice information is emitted and to send out a rotating instruction; and rotating the display main body according to the rotating instruction; wherein:

an angle θ is calculated based on the location where the voice information is emitted, and the angle θ is provided between a connecting line, which is from a center point on a display surface of the display main body to the location where the voice information is emitted, and a line that passes the center point and extends in a horizontal direction on the display surface, and whether the angle θ falls within an optimal viewing angle range is determined; and if the angle θ is not within the optimal viewing angle range, the display main body is rotated, until the angle θ is rotated into the optimal viewing angle range.

14. The method for regulating the viewing angle of the display device according to claim 13, before determining the location where the voice information is emitted and sending out the rotating instruction, further comprising:

analyzing the received voice information, and based on an analysis result, controlling the display main body to rotate or not, wherein if the display main body is to rotate, the location where the voice information is emitted is determined and the rotating instruction is sent out, and the display main body is rotated according to the rotating instruction.

15. The method for regulating the viewing angle of the display device according to claim 13, wherein the optimal viewing angle range is in a range of [ω+k, 180°−ω−k], ω has a certain numeric value according to different modes of the display device, and 0°≤k≤90°−ω.

16. The method for regulating the viewing angle of the display device according to claim 13, wherein if the angle θ is not within the optimal viewing angle range, a rotation angle σ, by which the display main body is to be rotated, is calculated according to the angle θ, so as to control rotation of the display main body;

in response to $\theta \in [0°, \omega+k), \sigma=\theta-\omega-k$;

in response to $\theta \in (270°, 360°], \sigma=\theta-\omega-k-360°$;

in response to $\theta \in (180°-\omega-k, 270°], \sigma=\theta-(180°-\omega-k)$;

wherein where σ is positive, the display main body is rotated clockwise, and where σ is negative, the display main body is rotated anticlockwise.

17. The display device according to claim 2, wherein the control device comprises a storage unit for storing the optimal viewing angle range [ω+k, 180°−ω−k], in which the display main body is viewed from a location where the voice information is emitted, wherein ω has a certain numeric value according to different modes of the display device, and 0°≤k≤90°−ω.

* * * * *